United States Patent
Maikhuri et al.

(10) Patent No.: US 12,488,308 B2
(45) Date of Patent: Dec. 2, 2025

(54) IN-TRANSIT MATERIAL OWNERSHIP CONTRACT OPTIMIZATION FOR COST, INSURANCE, AND FREIGHT (CIF) SHIPMENTS

(71) Applicant: Dell Products L.P., Round Rock, TX (US)

(72) Inventors: Ajay Maikhuri, Bangalore (IN); Dhilip Kumar, Bangalore (IN); Rajesh Krishnan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/324,318

(22) Filed: May 26, 2023

(65) Prior Publication Data

US 2024/0394648 A1 Nov. 28, 2024

(51) Int. Cl.
*G06Q 10/0835* (2023.01)
*G06Q 10/083* (2024.01)

(52) U.S. Cl.
CPC ..... *G06Q 10/0835* (2013.01); *G06Q 10/0838* (2013.01)

(58) Field of Classification Search
CPC .......... G06Q 10/0875; G06Q 10/0835; G06Q 10/0838; G06N 20/00
See application file for complete search history.

(56) References Cited

U.S. PATENT DOCUMENTS

| | | | |
|---|---|---|---|
| 2021/0142253 A1* | 5/2021 | Cohen ................ | G06Q 30/0202 |
| 2022/0138681 A1* | 5/2022 | Newell .............. | G06Q 10/0838 |
| | | | 705/341 |
| 2023/0096163 A1* | 3/2023 | Narayanam .......... | G06Q 30/04 |
| | | | 705/7.25 |
| 2023/0205674 A1* | 6/2023 | Sahu ....................... | G06N 3/08 |
| | | | 717/125 |

OTHER PUBLICATIONS

K. Narayanam, p. Dayama and S. Nishad, "Accelerated carrier invoice factoring using predictive freight transport events," 2022 IEEE International Conference on Blockchain and Cryptocurrency (ICBC), Shanghai, China, 2022, pp. 1-5, doi: 10.1109/ICBC54727. 2022.9805495. (Year: 2022).*

* cited by examiner

*Primary Examiner* — George Chen
*Assistant Examiner* — Tayar M Kyu
(74) *Attorney, Agent, or Firm* — DALY, CROWLEY, MOFFORD & DURKEE, LLP

(57) ABSTRACT

A method includes capturing shipment milestone data of cost, insurance, and freight (CIF) shipments, recording the shipment milestone data within a distributed ledger, generating a training dataset using past shipment milestone data recorded within the distributed ledger, and generating a machine learning (ML) model configured with explainable artificial intelligence (XAI) based on the training dataset. The method also includes receiving information regarding a CIF shipment from a computing device, determining one or more relevant features from the information regarding the CIF shipment, the relevant features influencing prediction of (Continued)

a lead time for ownership transfer, and generating, using the ML model configured with XAI, a prediction of a lead time for ownership transfer with an explanation of the prediction for the CIF shipment based on the determined relevant features. The method may also include sending the prediction of the lead time for ownership transfer with the explanation to the computing device.

17 Claims, 9 Drawing Sheets

IN-TRANSIT MATERIAL OWNERSHIP CONTRACT OPTIMIZATION FOR COST, INSURANCE, AND FREIGHT (CIF) SHIPMENTS

BACKGROUND

Inventory in transit (also known as "in-transit inventory") is a shipping term that refers to inventory (e.g., goods or materials) that has been shipped by a seller but has yet to reach a buyer's agreed destination. As the name suggests, the inventory items are in-transit to their destination as well as their respective buyer. A question of ownership of the goods, as well as the obligations that come with ownership, may arise while the goods are in transit.

Freight on board (also known as "free on board") (FOB) is a term used to designate at what point respective obligations, costs, and risk involved in the delivery of goods shift from the seller to the buyer. FOB shipping is where the seller is liable for the goods until the goods begin their transport to the buyer. In other words, the buyer becomes liable for the goods as soon as the goods begin their transport to the buyer (e.g., the goods are boarded on a ship or other mode of transport to the buyer). FOB destination is where the seller is liable for the goods until the goods have reached the buyer (e.g., until the goods have reached a destination agreed on by the buyer). With eCommerce shipping, the eCommerce merchant has ownership of the goods until the goods reach the buyer (e.g., the end customer). The question of ownership of the goods for FOB shipping, FOB destination, and eCommerce shipping is straight forward.

Cost, insurance, and freight (CIF) is where the seller is responsible for the costs of transporting the goods and obtaining insurance to protect the buyer from any damage to the goods during transport of the goods. With CIF shipping, the goods are transported to the buyer's destination named in the sales contract. Once the goods are loaded onto the vessel for transport, the risk of loss or damage is transferred from the seller to the buyer. However, insuring the goods and paying for freight remain the seller's responsibility. Thus, the question of ownership of the goods for CIF shipping is complex due to the seller's continued obligation to pay for insurance and freight even after the risk of loss or damage has been transferred to the buyer.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, by a computing device, capturing shipment milestone data of cost, insurance, and freight (CIF) shipments, recording the shipment milestone data within a distributed ledger, generating a training dataset using past shipment milestone data recorded within the distributed ledger, and generating a machine learning (ML) model configured with explainable artificial intelligence (XAI) based on the training dataset. The method also includes, by the computing device, receiving information regarding a CIF shipment from another computing device; determining one or more relevant features from the information regarding the CIF shipment, the one or more relevant features influencing prediction of a lead time for ownership transfer, and generating, using the ML model configured with XAI, a prediction of a lead time for ownership transfer with an explanation of the prediction for the CIF shipment based on the determined one or more relevant features. The method also includes, by the computing device, sending the prediction of the lead time for ownership transfer with the explanation of the prediction to the another computing device.

In some embodiments, the ML model configured with XAI includes an explainable random forest regression model.

In some embodiments, the shipment milestone data is based on data regarding physical movements of materials during transport.

In some embodiments, the shipment milestone data is captured using smart contracts generated for the CIF shipments.

In some embodiments, the distributed ledger includes a permissioned distributed ledger configured to execute the smart contracts to capture the shipment milestone data. In one aspect, the explanation of the prediction for the CIF shipment includes one or more of how the relevant features contributed to the prediction, an algorithm used to make the prediction, or a last time the ML model configured with XAI was trained.

In some embodiments, the training dataset comprises a plurality of training/testing samples, wherein each training/testing sample of the plurality of training/testing samples includes one or more features extracted from the past shipment milestone data. In one aspect, the one or more features includes a feature indicative of an organization shipping, a route, a carrier, a vessel name, a pallets per shipment, a year, a quarter, a month, or a week of year.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

In-transit material ownership transfer for a cost, insurance, and freight (CIF) shipment is complex and requires periodical optimization since the material cost, insurance, and freight charges are involved. Due to the seller's continued obligation to pay for insurance and freight even after the risk of loss or damage has transferred to the buyer, it is beneficial for buyers to delay taking ownership of the in-transit material to avoid the obligations that come with ownership (e.g., having to pay for insurance and freight). Conversely, it is beneficial for sellers to quicken the ownership transfer to buyers to not pay for insurance and freight. In most cases, in-transit material ownership transfer for a CIF shipment is at a fixed time that is negotiated by the seller and buyer based on their expertise. For example, the seller and buyer may negotiate a lead time of 23 days for ownership transfer of the in-transit material based on their expectation from experience that it will take 23 days to cover 75% of the distance the material has to be transported. Under such an agreement, the ownership of the in-transit material will transfer to the buyer on the threshold $23^{rd}$ day regardless of whether 75% of the distance has been covered. However, the transport may be delayed for various reasons resulting in less than 75% of the distance being covered on the $23^{rd}$ day.

Disclosed herein are computer-implemented structures and techniques for in-transit material ownership contract optimization for CIF shipments. The optimization can be achieved by capturing shipment milestone data of CIF shipments, analyzing the captured shipment milestone data, and recommending lead times for ownership transfers for CIF shipments. According to some embodiments, the captured shipment milestone data is recorded in a distributed ledger (e.g., a permissioned distributed ledger). According to some embodiments, a machine learning (ML) model configured with explainable artificial intelligence (XAI) is leveraged to generate the recommendations of lead times for ownership transfers for CIF shipments. Numerous aspects and features are described in detail below and will be apparent in light of this disclosure.

Figure 1:
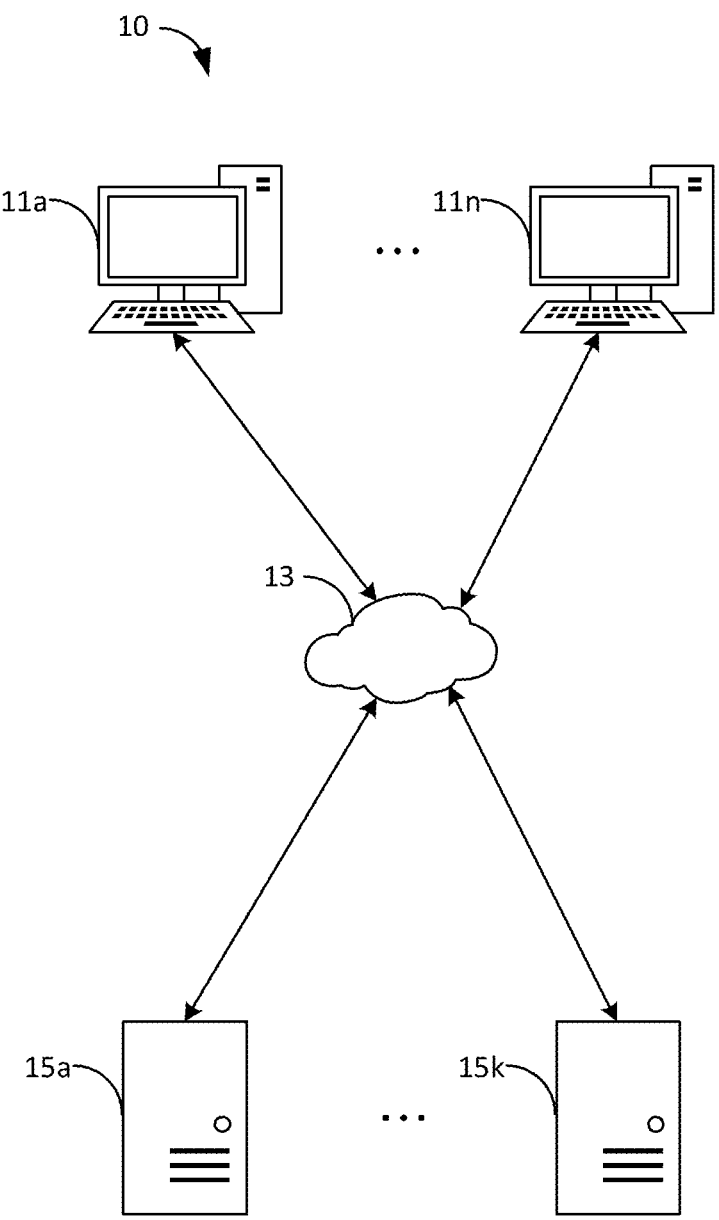
FIG. 1 is a diagram illustrating an example network environment of computing devices in which various aspects of the disclosure may be implemented, in accordance with an embodiment of the present disclosure.

Referring now to FIG. 1, shown is a diagram illustrating an example network environment 10 of computing devices in which various aspects of the disclosure may be implemented, in accordance with an embodiment of the present disclosure. As shown, environment 10 includes one or more client machines 11*a*-11*n* (11 generally), one or more server machines 15*a*-15*k* (15 generally), and one or more networks 13. Client machines 11 can communicate with server machines 15 via networks 13. Generally, in accordance with client-server principles, a client machine 11 requests, via network 13, that a server machine 15 perform a computation or other function, and server machine 15 responsively fulfills the request, optionally returning a result or status indicator in a response to client machine 11 via network 13.

In some embodiments, client machines 11 can communicate with remote machines 15 via one or more intermediary appliances (not shown). The intermediary appliances may be positioned within network 13 or between networks 13. An intermediary appliance may be referred to as a network interface or gateway. In some implementations, the intermediary appliance may operate as an application delivery controller (ADC) in a datacenter to provide client machines (e.g., client machines 11) with access to business applications and other data deployed in the datacenter. The intermediary appliance may provide client machines with access to applications and other data deployed in a cloud computing environment, or delivered as Software as a Service (SaaS) across a range of client devices, and/or provide other functionality such as load balancing, etc.

Client machines 11 may be generally referred to as computing devices 11, client devices 11, client computers 11, clients 11, client nodes 11, endpoints 11, or endpoint nodes 11. Client machines 11 can include, for example, desktop computing devices, laptop computing devices, tablet computing devices, mobile computing devices, workstations, and/or hand-held computing devices. Server machines 15 may also be generally referred to as a server farm 15. In some embodiments, a client machine 11 may have the capacity to function as both a client seeking access to resources provided by server machine 15 and as a server machine 15 providing access to hosted resources for other client machines 11.

Server machine 15 may be any server type such as, for example, a file server, an application server, a web server, a proxy server, a virtualization server, a deployment server, a Secure Sockets Layer Virtual Private Network (SSL VPN) server; an active directory server; a cloud server; or a server executing an application acceleration program that provides firewall functionality, application functionality, or load balancing functionality. Server machine 15 may execute, operate, or otherwise provide one or more applications. Non-limiting examples of applications that can be provided include software, a program, executable instructions, a virtual machine, a hypervisor, a web browser, a web-based client, a client-server application, a thin-client, a streaming application, a communication application, or any other set of executable instructions.

In some embodiments, server machine 15 may execute a virtual machine providing, to a user of client machine 11, access to a computing environment. In such embodiments, client machine 11 may be a virtual machine. The virtual machine may be managed by, for example, a hypervisor, a virtual machine manager (VMM), or any other hardware virtualization technique implemented within server machine 15.

Networks 13 may be configured in any combination of wired and wireless networks. Network 13 can be one or more of a local-area network (LAN), a wide area network (WAN), a metropolitan area network (MAN), a virtual private network (VPN), a primary public network, a primary private network, the Internet, or any other type of data network. In some embodiments, at least a portion of the functionality associated with network 13 can be provided by a cellular data network and/or mobile communication network to facilitate communication among mobile devices. For short range communications within a wireless local-area network (WLAN), the protocols may include 802.11, Bluetooth, and Near Field Communication (NFC).

Figure 2:
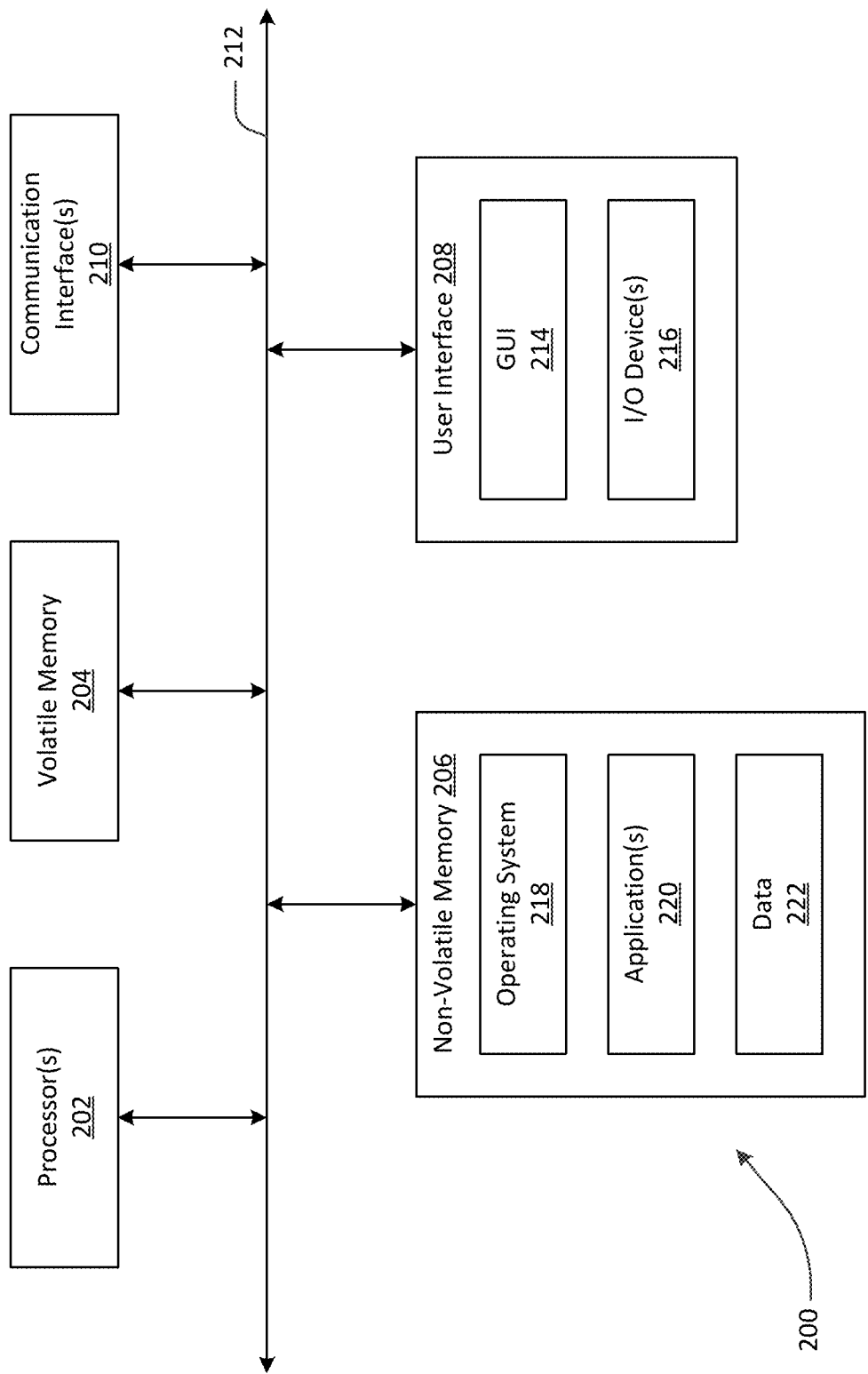
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 200 in which various aspects of the disclosure may be implemented, in accordance with an embodiment of the present disclosure. For instance, client machines 11 and/or server machines 15 of FIG. 1 can be substantially similar to computing device 200. As shown, computing device 200 includes one or more processors 202, a volatile memory 204 (e.g., random access memory (RAM)), a non-volatile memory 206, a user interface (UI) 208, one or more communications interfaces 210, and a communications bus 212.

Non-volatile memory 206 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 208 may include a graphical user interface (GUI) 214 (e.g., a touchscreen, a display, etc.) and one or more input/output (I/O) devices 216 (e.g., a mouse, a keyboard, a microphone, one or more speakers, one or more cameras, one or more biometric scanners, one or more environmental sensors, and one or more accelerometers, etc.).

Non-volatile memory 206 stores an operating system 218, one or more applications 220, and data 222 such that, for example, computer instructions of operating system 218 and/or applications 220 are executed by processor(s) 202 out of volatile memory 204. In one example, computer instructions of operating system 218 and/or applications 220 are executed by processor(s) 202 out of volatile memory 204 to perform all or part of the processes described herein (e.g., processes illustrated and described with reference to FIGS. 4 through 7). In some embodiments, volatile memory 204 may include one or more types of RAM and/or a cache memory that may offer a faster response time than a main memory. Data may be entered using an input device of GUI 214 or received from I/O device(s) 216. Various elements of computing device 200 may communicate via communications bus 212.

The illustrated computing device 200 is shown merely as an illustrative client device or server and may be implemented by any computing or processing environment with any type of machine or set of machines that may have suitable hardware and/or software capable of operating as described herein.

Processor(s) 202 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 202 may be analog, digital, or mixed signal. In some embodiments, processor 202 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 210 may include one or more interfaces to enable computing device 200 to access a computer network such as a Local Area Network (LAN), a Wide Area Network (WAN), a Personal Area Network (PAN), or the Internet through a variety of wired and/or wireless connections, including cellular connections.

In described embodiments, computing device 200 may execute an application on behalf of a user of a client device. For example, computing device 200 may execute one or more virtual machines managed by a hypervisor. Each virtual machine may provide an execution session within which applications execute on behalf of a user or a client device, such as a hosted desktop session. Computing device 200 may also execute a terminal services session to provide a hosted desktop environment. Computing device 200 may provide access to a remote computing environment including one or more applications, one or more desktop applications, and one or more desktop sessions in which one or more applications may execute.

Figure 3:
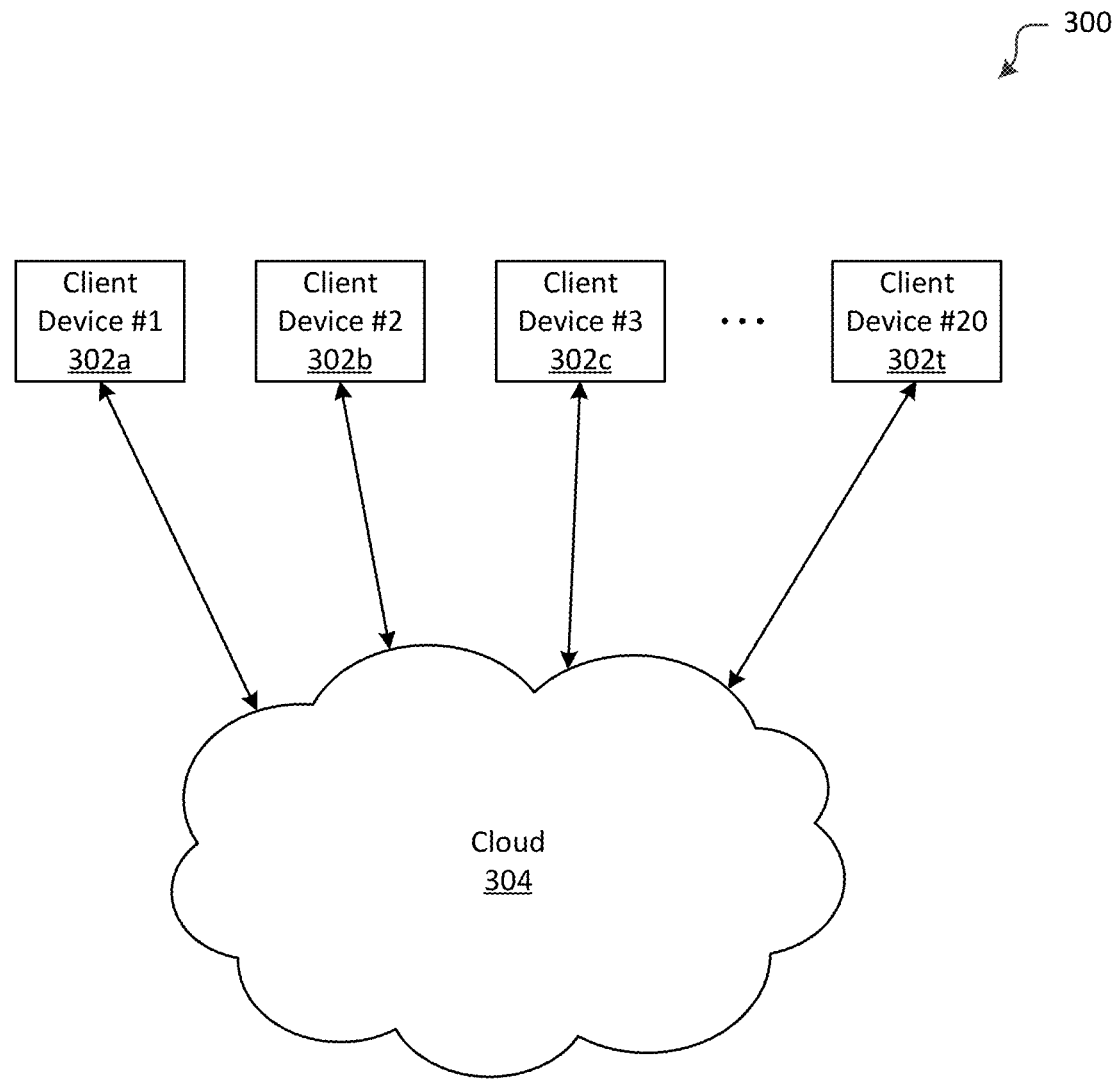
FIG. 3 is a diagram of a cloud computing environment in which various aspects of the concepts described herein may be implemented.

Referring to FIG. 3, shown is a diagram of a cloud computing environment 300 in which various aspects of the concepts described herein may be implemented. Cloud computing environment 300, which may also be referred to as a cloud environment, cloud computing, or cloud network, can provide the delivery of shared computing resources and/or services to one or more users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more client devices 302a-302t (such as client machines 11 and/or computing device 200 described above) may be in communication with a cloud network 304 (sometimes referred to herein more simply as a cloud 304). Cloud 304 may include back-end platforms such as, for example, servers, storage, server farms, or data centers. The users of clients 302a-302t can correspond to a single organization/tenant or multiple organizations/tenants. More particularly, in one implementation, cloud computing environment 300 may provide a private cloud serving a single organization (e.g., enterprise cloud). In other implementations, cloud computing environment 300 may provide a community or public cloud serving one or more organizations/tenants.

In some embodiments, one or more gateway appliances and/or services may be utilized to provide access to cloud computing resources and virtual sessions. For example, a gateway, implemented in hardware and/or software, may be deployed (e.g., reside) on-premises or on public clouds to provide users with secure access and single sign-on to virtual, SaaS, and web applications. As another example, a secure gateway may be deployed to protect users from web threats.

In some embodiments, cloud computing environment 300 may provide a hybrid cloud that is a combination of a public cloud and a private cloud. Public clouds may include public servers that are maintained by third parties to client devices 302a-302t or the enterprise/tenant. The servers may be located off-site in remote geographical locations or otherwise.

Cloud computing environment 300 can provide resource pooling to serve clients devices 302a-302t (e.g., users of client devices 302a-302n) through a multi-tenant environment or multi-tenant model with different physical and virtual resources dynamically assigned and reassigned responsive to different demands within the respective environment. The multi-tenant environment can include a system or architecture that can provide a single instance of software, an application, or a software application to serve multiple users. In some embodiments, cloud computing environment 300 can include or provide monitoring services to monitor, control, and/or generate reports corresponding to the provided shared resources and/or services.

In some embodiments, cloud computing environment 300 may provide cloud-based delivery of various types of cloud computing services, such as Software as a service (SaaS), Platform as a Service (PaaS), Infrastructure as a Service (IaaS), and/or Desktop as a Service (DaaS), for example. IaaS may refer to a user renting the use of infrastructure resources that are needed during a specified period. IaaS providers may offer storage, networking, servers, or virtualization resources from large pools, allowing the users to quickly scale up by accessing more resources as needed. PaaS providers may offer functionality provided by IaaS, including. e.g., storage, networking, servers, or virtualization, as well as additional resources such as, for example, operating systems, middleware, and/or runtime resources. SaaS providers may offer the resources that PaaS provides, including storage, networking, servers, virtualization, operating systems, middleware, or runtime resources. SaaS providers may also offer additional resources such as, for example, data and application resources. DaaS (also known as hosted desktop services) is a form of virtual desktop service in which virtual desktop sessions are typically delivered as a cloud service along with the applications used on the virtual desktop.

Figure 4:
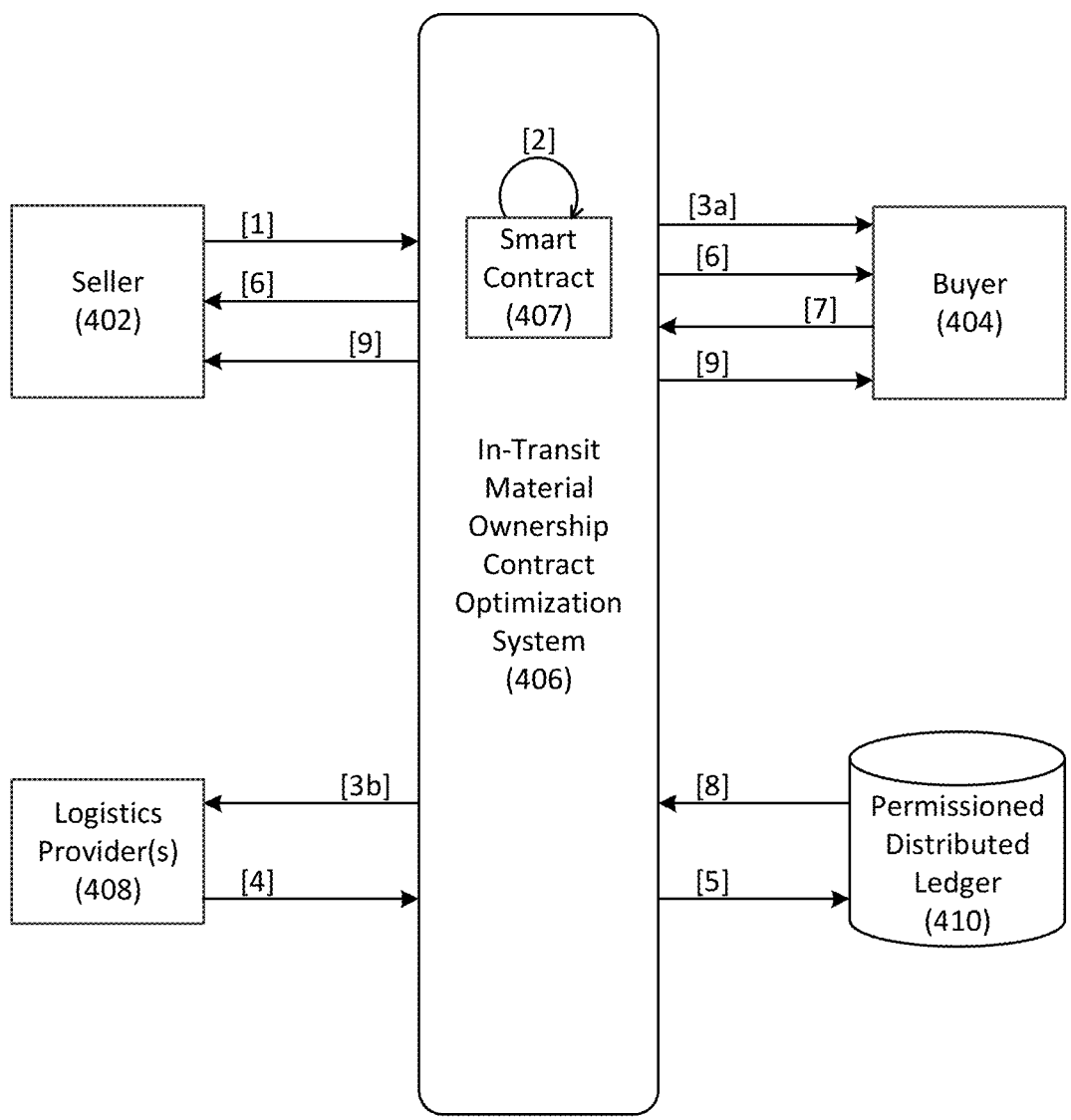
FIG. 4 is a schematic illustration of an example in-transit material ownership transfer topology that can be used to provide explainable lead time for ownership transfer recommendations to sellers and buyers, in accordance with an embodiment of the present disclosure.

FIG. 4 is a schematic illustration of an example in-transit material ownership transfer topology that can be used to provide explainable lead time for ownership transfer recommendations to sellers and buyers, in accordance with an embodiment of the present disclosure. Such a process can be understood as a cyclical process in which a seller 402 and a buyer 404 leverage the services of an in-transit material ownership contract optimization system 406. In-transit material ownership contract optimization system 406 is also referred to herein more simply as "system 406." For purposes of discussion of the example of FIG. 4, it is assumed that buyer 404 is purchasing materials (e.g., finished goods, components, etc.) from seller 402, in which the original purchase agreement stipulates CIF shipping for transporting the materials from seller 402 to buyer 404.

In the example of FIG. 4, prior to the movement of the materials from the seller's location, seller 402 may send [1] the shipment details to system 406. The shipment details include the shipping information related to the transport of the materials from seller 402 (e.g., the origin) to buyer 404 (e.g., the destination, i.e., buyer's designated location), including the agreed upon lead time (e.g., number of days) at which ownership of the materials transfers from seller 402 to buyer 404. In response, system 406 can generate [2] a smart contract 407 for the shipment of the materials from seller 402 to buyer 404 based on the received shipment details. Smart contract 407 can define one or more rules, such as if-then statements, for example, for capturing the shipment data at various milestones during the transport of the materials to buyer 404 (e.g., rules which can be executed to capture data about the shipment of the materials). Such data is also referred to herein as "CIF shipment milestone data" or more simply "shipment milestone data." For example, suppose that the shipment details indicate that the lead time for ownership transfer of the materials is 60 days under the expectation that it will take 60 days to reach 7,500 km of the 10,000 km of the transport distance (e.g., 75% of the transport distance). In this example, one rule may be to capture the actual number of days taken to cover 75% of the transport distance (e.g., "if at 7,500 km, then record number of days into the transport of the materials"). Another rule may be to capture the actual distance covered at the agreed to lead time for ownership transfer (e.g., "if at 60 days into the transport of the materials, then record the distance covered"). Still another rule may be to trigger the event to transfer ownership to buyer 404 upon the actual distance covered reaching a threshold distance (e.g., the distance agreed upon by seller 402 and buyer 404 as indicated in the shipment details). Other rules may be defined for capturing shipment milestone data, such as the date on which a logistics provider receives the materials for transport and the date on which a logistics provider transfers the materials to another logistics provider, to provide a couple examples. In any case, the defined rules can be understood as specifying the milestones at which the shipment data is to be collected.

In the example of FIG. 4, system 406 can send or otherwise provide [3a] the shipment details to buyer 404. System 406 can also send or otherwise provide [3b] the shipment details to logistics providers 408 that are being used to transport the materials. In some embodiments, system 406 may provide a UI, including UI elements/controls, for viewing the shipment details. For example, buyer 404 and/or logistics providers 408 can use the provided UI, such as a console, to log in to system 406 and securely view the shipment details.

The individual logistics providers 408 can then send or otherwise provide [4] the shipment data during the transport of the materials. For example, in one implementation, logistics providers 408 may enable (e.g., equip) the vessels, aircraft, and other vehicles used for transporting goods with edge gateways for transmitting location and other data. The vessels/vehicles transporting the materials from seller 402 to buyer 404 can then utilize the edge gateways to send real-time location data continuously or periodically to system 406 (e.g., according to a predetermined schedule). System 406 may then persist the data received from logistics providers 408 and call [5] permissioned distributed ledger 410 to trigger smart contract 407. In response, permissioned distributed ledger 410 may execute smart contract 407 to capture the shipment milestone data (e.g., apply the rules of smart contract 407 to the location data received from logistics providers 408 to capture the shipment milestone data). Permissioned distributed ledger 410 may then record the shipment milestone data in the chain of transactions for the shipment (e.g., add the shipment milestone data to the sequential chain of cryptographic hash-linked blocks created to record the transport of the materials from seller 402 to buyer 404). In this way, permissioned distributed ledger 410 immutably records the shipment milestone data. That is, permissioned distributed ledger 410 records the chain of the physical movement of the material immutably. Storing the shipment milestone data in this way facilitates mutual trust between seller 402, buyer 404, and logistics providers 408.

During transit of the materials, seller 402 and buyer 404 may view [6] the shipment milestone data stored within permissioned distributed ledger 410. For example, seller 402 and buyer 404 can use the UI provided by system 406 to log on and securely view the shipment milestone data. Upon receiving the materials, buyer 404 may send or otherwise provide [7] a notification to system 406 informing of the receipt of the materials that causes system 406 to record the receipt of the materials by buyer 404 within permissioned distributed ledger 410. In some implementations, buyer 404 may record the receipt of the materials within permissioned distributed ledger 410. For example, upon receiving the materials, buyer 404 may execute smart contract 407 to capture the shipment milestone data.

After receipt of the materials by buyer 404, system 406 may analyze [8] the shipment milestone data for the for the transport of the materials from seller 402 to buyer 404 stored within permissioned distributed ledger 410 to generate a recommendation of a lead time for ownership transfer for the completed CIF shipment. For example, according to some embodiments, system 406 may leverage a machine learning (ML) model configured with explainable artificial intelligence (XAI) (also known as interpretable AI) to predict a lead time to recommend for ownership transfer for the completed CIF shipment. The explainable ML model also outputs an explanation of the prediction (i.e., the rationale behind the prediction). System 406 may then recommend [9] the predicted lead time for ownership transfer for the completed CIF shipment to seller 402 and buyer 404 along with the explanation as to how and why the recommended lead time was determined. The provided explanation allows seller 402 and buyer 404 to better understand the recommended lead time for ownership transfer for the CIF shipment.

In some embodiments, system 406 may provide a dashboard for viewing the recommendation and the explanation. For example, seller 402 and buyer 404 can log in to the dashboard and view the recommended lead time with the explanation. The explanation may include, for example, how the features contributed to the predicted lead time, the features which contributed most to the predicted lead time, and how the features interacted in making the prediction. Seller 402 and buyer 404 can also use the dashboard to view the shipment milestone data that are recorded within permissioned distributed ledger 410. Seller 402 and buyer 404 can then collaborate and agree to accept or not accept the recommended lead time for ownership transfer for upcoming (i.e., future) CIF shipments with the aid of the provided explanation for the recommendation and the immutable shipment milestone data (i.e., the "unbiased evidence" associated with the completed CIF shipment).

Figure 5:
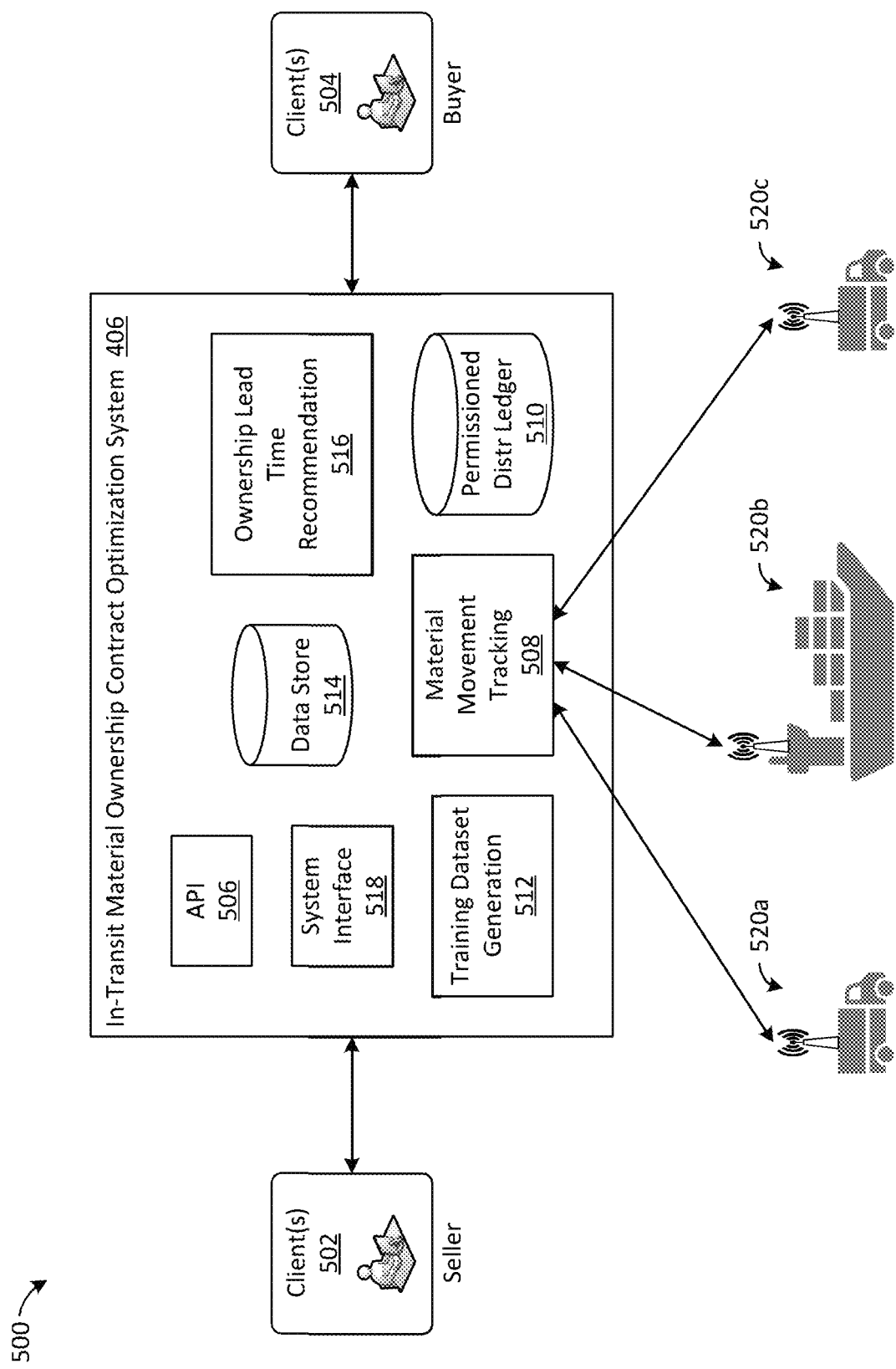
FIG. 5 is a block diagram of an illustrative system for in-transit material ownership contract optimization, in accordance with an embodiment of the present disclosure.

Referring now to FIG. 5 and with continued reference to FIG. 4, shown is a block diagram of an illustrative system 500 for in-transit material ownership contract optimization, in accordance with an embodiment of the present disclosure. Illustrative system 500 includes one or more clients 502 and one or more clients 504 configured to communicate with in-transit material ownership contract optimization system 406 via one or more networks (e.g., the Internet). In the example of FIG. 5, client 502 may correspond to a device client used by seller 402 of FIG. 4 and client 504 may correspond to a client device used by buyer 404 of FIG. 4.

In some embodiments, system 500 may form part of a network environment, such as network environment 10 of FIG. 1. For example, clients 502, 504 of FIG. 5 may correspond to client machines 11 of FIG. 1, system 406 of FIG. 5 may correspond to one or more server machines 15 of FIG. 1, and the network may correspond to networks 13 of FIG. 1.

In some embodiments, system 500 may form part of a cloud computing environment, such as cloud computing environment 300 of FIG. 3. For example, clients 502, 504 of FIG. 5 may correspond to client devices 302a-302t of FIG. 3, and system 406 of FIG. 5 may correspond to a virtual or physical server providing a cloud-based service, such as SaaS.

Clients 502, 504 may include any type of client devices configured to install and/or run applications (or "apps"). For example, a representative client 502 may run a client application, such as a web client or a dedicated application, that a user (e.g., seller 402 of FIG. 4) can use to access and interact with system 406. Similarly, a representative client 504 may run a client application, such as a web client or a dedicated application, that a user (e.g., buyer 404 of FIG. 4) can use to access and interact with system 406. The client application and/or system 406 may be implemented as computer instructions executable to perform the corresponding functions disclosed herein. In the example of FIG. 5, system 406 includes an application programming interface (API) module 506, a material movement tracking module 508, a permissioned distributed ledger 510, a training dataset generation module 512, a data store 514, an ownership lead time recommendation module 516, and a system interface 518.

The client application on client 502, 504 can communicate with system 406 using an API. For example, the client application on client 502, 504 can send requests (or "messages") to system 406 wherein the requests are received and processed by API module 506 or one or more other components of system 406. Likewise, system 406 can utilize API module 506 to send responses/messages to the client application on client 502, 504.

Referring to system 406, material movement tracking module 508 is operable to track the physical movement of the material. To this end, in one implementation, material moving tracking module 508 may utilize one or more IoT gateways to capture the physical movement of the material during transport. For example, as shown in FIG. 5, vessels 520a, 520b, 520c (520 generally) that are being utilized by the logistics providers to transport materials may be configured to send real-time location data continuously or periodically to material movement tracking module 508 during transport of the materials. Material movement tracking module 508 can persist the data received from vessels 520 and call permissioned distributed ledger 510 to trigger the smart contracts.

Permissioned distributed ledger 510 is operable to record the material movement immutably. Permissioned distributed ledger 510 can be the same or similar to permissioned distributed ledger 410 of FIG. 4. In some embodiments, for each shipment of materials from a seller to a buyer, permissioned distributed ledger 510 can create a sequential chain of cryptographic hash-linked transaction blocks to record the shipment milestone data for the shipment. The first transaction block in a chain is a genesis block for the shipment, and each transaction block in the chain records the shipment milestone data representing the physical movement of the material being transported. In some embodiments, permissioned distributed ledger 510 may trigger the smart contracts to capture the shipment milestone data to be recorded in the transaction blocks. As mentioned previously, a smart contract created for a shipment of materials can define one or more rules for capturing the shipment data at various milestones during the transport of the materials. An illustrative chain of transaction blocks for an example shipment of materials in permissioned distributed ledger 510 is shown in FIG. 6.

Figure 6:
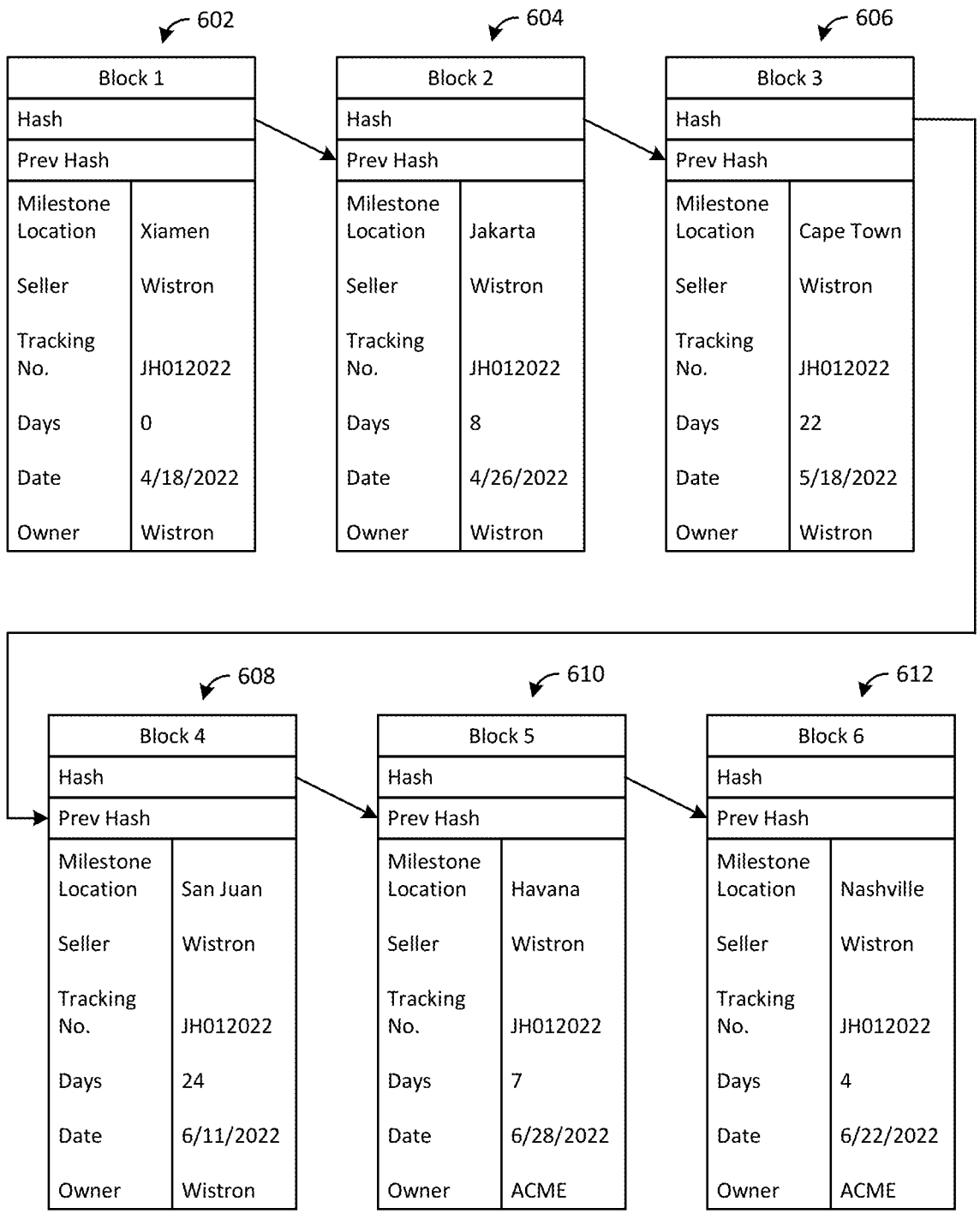
FIG. 6 is a diagram showing illustrative chain of transaction blocks for an example shipment of materials in a permissioned distributed ledger of the system of FIG. 5, in accordance with an embodiment of the present disclosure.

As shown in FIG. 6, the chain includes transaction blocks 602-612. Each transaction block contains a hash, a hash of the immediately preceding transaction block in the chain, and the shipment milestone data (e.g., the shipment transaction data) recorded by the transaction block. The hash of a transaction block is based on the contents of the transaction block and serves as a unique identifier for the transaction block. The first or genesis transaction block is the start of the chain and does not include the hash of an immediately preceding transaction block as one does not exist. When a new transaction block is added to the chain, the hash of the last transaction block is included in the newly added transaction block, creating a chain of transaction blocks secured using hashes of immediately preceding transaction blocks.

In the example of FIG. 6, Wistron is the seller of the materials, ACME is the buyer of the materials, and the materials are being shipped from the seller's designated location (origin), Xiamen, China, to the buyer's designated location (destination), Nashville, USA. Transaction block 602 is the genesis block which records the data at the start of the shipment (e.g., at the start of the transport of the materials) and indicates that the shipment is originating at Xiamen ("Milestone Location Xiamen"), that Wistron is the seller ("Seller Wistron"), that the tracking number of the shipment is JH012022 ("Tracking No. JH012022"), that the number of days taken to reach the milestone location is 0 days ("Days 0"), the current date is Apr. 18, 2022 ("Date 4/18/2022"), and that Wistron is the owner of the materials at this milestone. Note that the number of days to reach the milestone location Xiamen is 0 since Xiamen is the starting location of the shipment.

Transaction block 604 records the shipment data at the second milestone in the transport and indicates that the materials are located at Jakarta ("Milestone Location Jakarta"), that Wistron is the seller ("Seller Wistron"), that the tracking number of the shipment is JH012022 ("Tracking No. JH012022"), that the number of days taken to transport the materials from the preceding milestone location, Xiamen, to the current milestone location, Jakarta, is 8days ("Days 8"), that the current date is Apr. 26, 2022 ("Date 4/26/2022"), and that Wistron is the owner of the materials at this milestone. Transaction block 606 records the shipment data at the third milestone in the transport and indicates that the materials are located at Cape Town ("Milestone Location Cape Town"), that Wistron is the seller ("Seller Wistron"), that the tracking number of the shipment is JH012022 ("Tracking No. JH012022"), that the number of days taken to transport the materials from the preceding milestone location, Jakarta, to the current milestone location, Cape Town, is 22 days ("Days 22"), that the current date is May 8, 2022 ("Date 5/18/2022"), and that Wistron is the owner of the materials at this milestone.

Transaction block 608 records the shipment data at the fourth milestone in the transport and indicates that the materials are located at San Juan ("Milestone Location San Juan"), that Wistron is the seller ("Seller Wistron"), that the tracking number of the shipment is JH012022 ("Tracking No. JH012022"), that the number of days taken to transport the materials from the preceding milestone location, Cape Town, to the current milestone location, San Juan, is 24 days ("Days 24"), that the current date is Jun. 11, 2022 ("Date 6/11/2022"), and that Wistron is the owner of the materials at this milestone. Transaction block 610 records the shipment data at the fifth milestone in the transport and indicates that the materials are located at Havana ("Milestone Location Havana"), that Wistron is the seller ("Seller Wistron"), that the tracking number of the shipment is JH012022 ("Tracking No. JH012022"), that the number of days taken to transport the materials from the preceding milestone location, San Juan, to the current milestone location Havana, is 7 days ("Days 7"), that the current date is June 18, 2022("Date 6/18/2022"), and that ACME is the owner of the materials at this milestone.

Transaction block 612 records the shipment data at the final milestone in the transport and indicates that the materials are located at Nashville ("Milestone Location Nashville"), that Wistron is the seller ("Seller Wistron"), that the tracking number of the shipment is JH012022 ("Tracking No. JH012022"), that the number of days taken to transport the materials from the preceding milestone location, Havana, to the current milestone location Nashville, is 4days ("Days 7"), that the current date is June 22, 2022 ("Date 6/22/2022"), and that ACME is the owner of the materials at this milestone. Since the materials are located at the buyer's designated location, Nashville, the shipment is complete and there are no more transaction blocks in the chain. That is, transaction block 612 is the last block in the chain. The shipment milestone data recorded in the transaction blocks illustrated in FIG. 6 are merely examples of data that may be recorded for a shipment of materials and should not be construed to limit the embodiments described herein.

Referring again to FIG. 5, training dataset generation module 512 is operable to generate (or "create") a training dataset for use in generating (e.g., training, testing, etc.) an ML model (e.g., an explainable random forest regression model) to predict a lead time for ownership transfer along with an explanation of the rationale behind the prediction for a CIF shipment. Training dataset generation module 512 can generate the training dataset from a corpus of past CIF shipment data. For example, in some implementations, training dataset generation module 512 may obtain the past CIF shipment data from permissioned distributed ledger 510.

To generate a training dataset, training dataset generation module 512 may preprocess the past CIF shipment data to be in a form that is suitable for training and testing the ML model (e.g., a random forest regression algorithm with XAI). In one embodiment, training dataset generation module 512 may utilize natural language processing (NLP) algorithms and techniques to preprocess the retrieved historical field support data. For example, the data preprocessing may include tokenization (e.g., splitting a phrase, sentence, paragraph, or an entire text document into smaller units, such as individual words or terms), noise removal (e.g., removing whitespaces, characters, digits, and items of text which can interfere with the extraction of features from the data), stop words removal, stemming, and/or lemmatization.

The data preprocessing may also include placing the data into a tabular format. In the table, the structured columns represent the features (also called "variables"), and each row represents an observation or instance (e.g., a CIF shipment). Thus, each column in the table shows a different feature of the instance. The data preprocessing may also include placing the data (information) in the table into a format that is suitable for training a model (e.g., placing into a format that is suitable for a random forest regression algorithm with XAI to learn from to generate (or "build") the ML model, e.g., an explainable random forest regression model). For example, since machine learning deals with numerical values, textual categorical values (i.e., free text) in the columns can be converted (i.e., encoded) into numerical values. According to one embodiment, the textual categorical values may be encoded using label encoding. According to alternative embodiments, the textual categorical values may be encoded using one-hot encoding or other suitable encoding methods.

The data preprocessing may also include null data handling (e.g., the handling of missing values in the table). According to one embodiment, null or missing values in a column (a feature) may be replaced by median of the other values in that column. For example, median imputation may be performed using a median imputation technique such as that provided by Scikit-learn (Sklearn). According to alternative embodiments, observations in the table with null or missing values in a column may be replaced by a mode or mean value of the values in that column or removed from the table.

The data preprocessing may also include feature selection and/or data engineering to determine or identify the relevant or important features from the noisy data (e.g., the unnecessary features and the features that are highly correlated). The relevant/important features are the features that are more correlated with the thing being predicted by the trained model (e.g., a lead time for ownership transfer a for a CIF shipment). A variety of feature engineering techniques, such as exploratory data analysis (EDA) and/or bivariate data analysis with multivariate-variate plots and/or correlation heatmaps and diagrams, among others, may be used to determine the relevant features.

The data preprocessing can include adding an informative label to each instance in the training dataset. As explained above, each instance in the training dataset represents a CIF shipment. In some implementations, a label (e.g., an actual time of ownership transfer) can be added to each instance in the training dataset. The label added to each instance, i.e., the label added to each CIF shipment, is a representation of a prediction for that instance in the training dataset (e.g., the thing being predicted) and helps a machine learning model learn to make the prediction when encountered in data without a label.

Each instance in the table may represent a training/testing sample (i.e., an instance of a training/testing sample) in the training dataset and each column may be a relevant feature of the training/testing sample. As previously described, each training/testing sample may correspond to a CIF shipment. In a training/testing sample, the relevant features are the independent variables and the things being predicted (e.g., a lead time for ownership transfer a for a CIF shipment) is the dependent variable (e.g., label). In some embodiments, the individual training/testing samples may be used to generate a feature vector, which is a multi-dimensional vector of elements or components that represent the features in a training/testing sample. In such embodiments, the generated feature vectors may be used for training or testing an ML model using supervised learning to make the prediction. Examples of relevant features of a training dataset for training/testing an explainable random forest regression model for predicting a lead time for ownership transfer a for a CIF shipment are provided below with respect to FIG. 7.

In some embodiments, training dataset generation module 512 may reduce the number of features in the training dataset. For example, since the training dataset is being generated from the corpus of past CIF shipment data, the number of features (or input variables) in the dataset may be very large. The large number of input features can result in poor performance for machine learning algorithms. For example, in one embodiment, training dataset generation module 512 can utilize dimensionality reduction techniques, such as principal component analysis (PCA), to reduce the dimension of the training dataset (e.g., reduce the number of features in the dataset), hence improving the model's accuracy and performance.

In some embodiments, training dataset generation module 512 can generate the training dataset on a continuous or periodic basis (e.g., according to a predetermined schedule). Additionally or alternatively, training dataset generation module 512 can generate the training dataset in response to an input. For example, an authorized user of system 406 can use their client and issue a request to generate a training dataset. In response, training dataset generation module 512 can obtain the past CIF shipment data for generating the training dataset from permissioned distributed ledger 510 and generate the training dataset using the obtained past CIF shipment data. Training dataset generation module 512 can store the generated training dataset within data store 514, where it can subsequently be retrieved and used (e.g., retrieved and used to build an explainable random forest regression model for predicting a lead time for ownership transfer a for a CIF shipment). In some embodiments, data store 514 may correspond to a storage service within the computing environment of system 406.

Ownership lead time recommendation module 516 is operable to recommend a lead time for ownership transfer for a CIF shipment. In particular, according to some embodiments, ownership lead time recommendation module 516 can determine the lead time for ownership transfer for a CIF shipment based on an analysis of information and data about the CIF shipment such as, for example, the origin and destination of the shipment, the time of the shipment (e.g., seasonality), details of the shipment route, volume of material being shipped, the logistics carrier(s) that are being employed to transport the material, and the different modes of shipment being used. Ownership lead time recommendation module 516 may include with the recommendation an explanation the rationale behind the recommendation (e.g., the reasons for recommending the lead time for ownership transfer).

In some embodiments, ownership lead time recommendation module 516 may implement or include an ML algorithm configured with explainable artificial intelligence (XAI), such as a random forest regression algorithm with XAI, trained to output a lead time for ownership transfer for a CIF shipment. The training dataset for training the explainable random forest model can be generated from past CIF shipment data, where the training can configure the explainable random forest regression model to learn the trends in the training dataset. Once trained, the explainable random forest regression model can, in response to input of information about a CIF shipment, predict a lead time for ownership transfer for the CIF shipment along with an explanation of the rationale behind the prediction. Further description of a random forest regression algorithm with XAI and other processing that can be implemented within ownership lead time recommendation module 516 is provided below at least with respect to FIG. 8.

System interface module 518 is operable to provide an interface with which users and devices may interact with system 406. For example, in one embodiment, system interface module 518 may provide a communication channel, such as a secure communication channel, for communicating with client devices, such as clients 502, 504. For example, users, such as sellers and buyers of CIF shipments being tracked by system 406 may use their clients to access permissioned distributed ledger 510 via the secure communication channel.

In some embodiments, system interface module 518 may include user interface (UI) controls/elements which may be presented on a UI of a client application on a client device and utilized to access system 406. For example, a user can click/tap/interact with the presented UI controls/elements to authenticate themselves (e.g., provide a username and password) to system 406. Once authenticated, the user can click/tap/interact with the presented UI controls/elements to request tracking of a CIF shipment as well as provide the shipment details (e.g., information about the CIF shipment that is to be tracked). As another example, an authenticated user can also use the presented controls/elements to receive and/or view details about their CIF shipments. An authenticated user can also use the presented controls/elements to access a dashboard provided by system 406. Using the dashboard, the user may view the recommended lead times for ownership transfers for their CIF shipments and the explanations for the recommended lead times. The user may also use the dashboard to view the shipment milestone data that is recorded within permissioned distributed ledger 510 as well as other data recorded for their CIF shipments.

Figure 7:
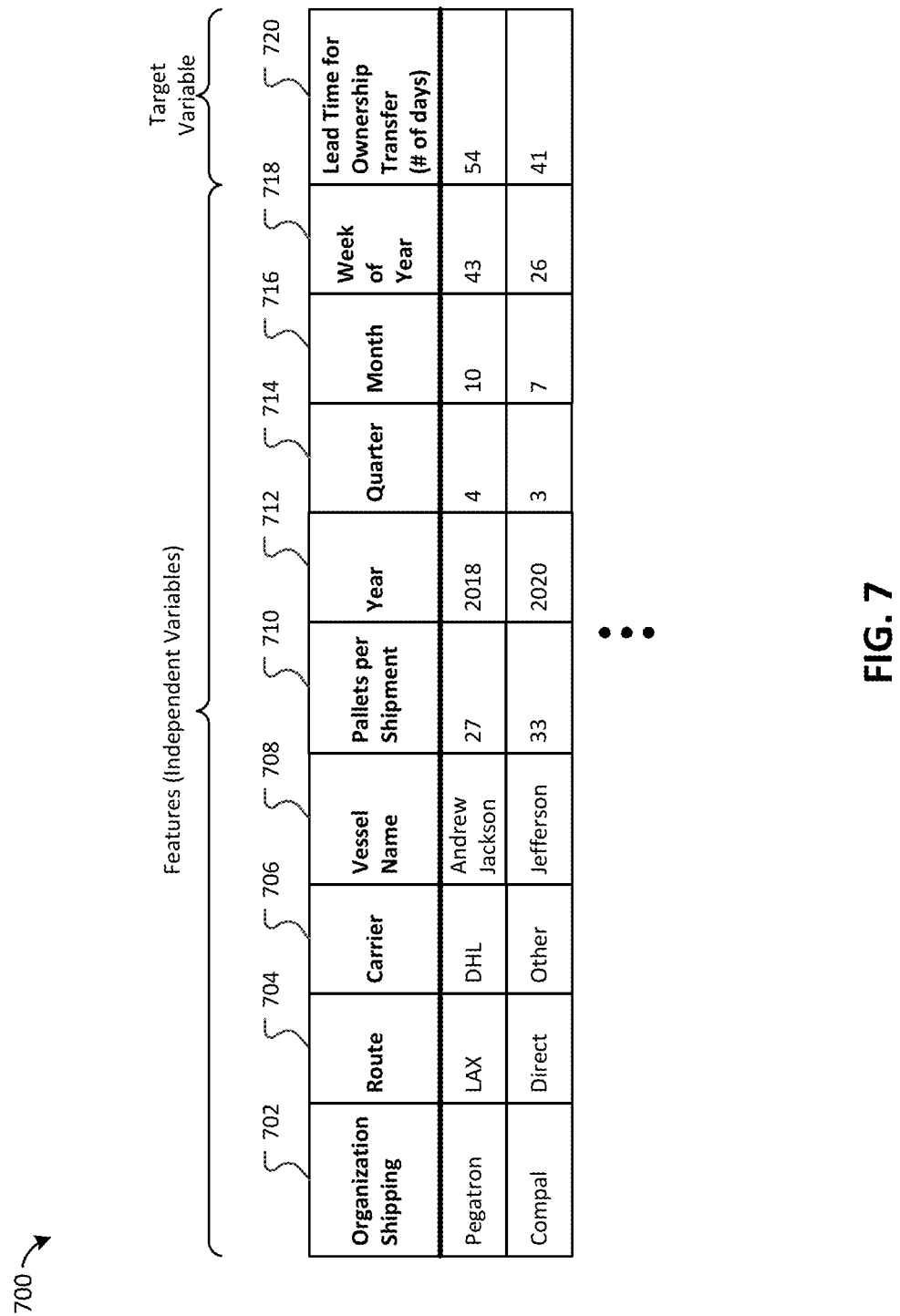
FIG. 7 is a diagram illustrating a portion of a data structure that can be used to store information about relevant features of a training dataset for training a machine learning (ML) model to predict a lead time for ownership transfer for a cost, insurance, and freight (CIF) shipment, in accordance with an embodiment of the present disclosure.

Referring now to FIG. 7 and with continued reference to FIG. 5, shown is a diagram illustrating a portion of a data structure 700 that can be used to store information about relevant features of a training dataset for training an ML model (e.g., an explainable random forest regression model) to predict a lead time for ownership transfer along with an explanation of the rationale behind the prediction for a CIF shipment, in accordance with an embodiment of the present disclosure. For example, the training dataset including the illustrated features, as well as other features generated from past (or "historical") CIF shipment data, may be used to train a random forest regression algorithm with XAI or other suitable supervised regression learning algorithm with XAI to predict a lead time for ownership transfer for a CIF shipment. As can be seen in FIG. 7, data structure 700 may be in a tabular format in which the structured columns represent the different relevant features (variables) regarding the past CIF shipment data and a row represents individual CIF shipments. The relevant parameters illustrated in data structure 700 are merely examples of parameters that may be extracted from past CIF shipment data used to generate a training dataset and should not be construed to limit the embodiments described herein.

As shown in FIG. 7, the relevant features may include an organization shipping 702, a route 704, a carrier 706, a vessel name 708, a pallets per shipment 710, a year 712, a quarter 714, a month 716, a week of year 718, and a lead time for ownership transfer 720. Organization shipping 702 indicates the organization (e.g., the seller of the materials) that is making the CIF shipment. Route 704 indicates the route taken to transport the materials. For example, "Direct" may indicate the route is from the originating location to the buyer's designated location without any stops. Non-direct routes may indicate the intermediate port or ports (e.g., LAX) in the transport of the material to the buyer's designated location. Carrier 706 indicates the logistics provider performing the transport. Vessel name 708 indicates the name of the vessel, aircraft, vehicle, etc., on which the material is being transported. Pallets per shipment 710 indicates the number of pallets of the material in the shipment. Year 712 indicates the year that the shipment occurred (e.g., the year that the material was shipped from the seller to the buyer). Quarter 714 indicates the quarter of the year (e.g., first quarter of the year, second quarter of the year, third quarter of the year, or fourth quarter of the year) in which the shipment occurred. Month 716 indicates the month in which the shipment occurred. Week of year 718 indicates the week of the year (e.g., first week, second week, etc.) in which the shipment occurred. Lead time for ownership transfer 720 indicates the actual time of ownership transfer (e.g., the number of days from the start of the shipment the ownership transfer occurred).

In data structure 700, each row may represent a training/testing sample (i.e., an instance of a training/testing sample) in the training dataset, and each column may show a different relevant feature of the training/testing sample. In some embodiments, the individual training/testing samples may be used to generate a feature vector, which is a multi-dimensional vector of elements or components that represent the parameters in a training/testing sample. In such embodiments, the generated feature vectors may be used for training/testing an explainable random forest regression model (e.g., the ML model implemented within ownership lead time recommendation module 516 of FIG. 5) to predict a lead time for ownership transfer for a CIF shipment. The features organization shipping 702, route 704, carrier 706, vessel name 708, pallets per shipment 710, year 712, quarter 714, month 716, and week of year 718 may be included in a training/testing sample as the independent variables, and lead time for ownership transfer 720 included as a dependent variable (target variable) in the training/testing sample. That is, lead time for ownership transfer 720 is the label added to the individual training/testing samples. The illustrated independent variables are features that influence performance of the explainable random forest regression model (i.e., parameters that are relevant (or influential) to prediction of a lead time for ownership transfer for a CIF shipment).

Figure 8:
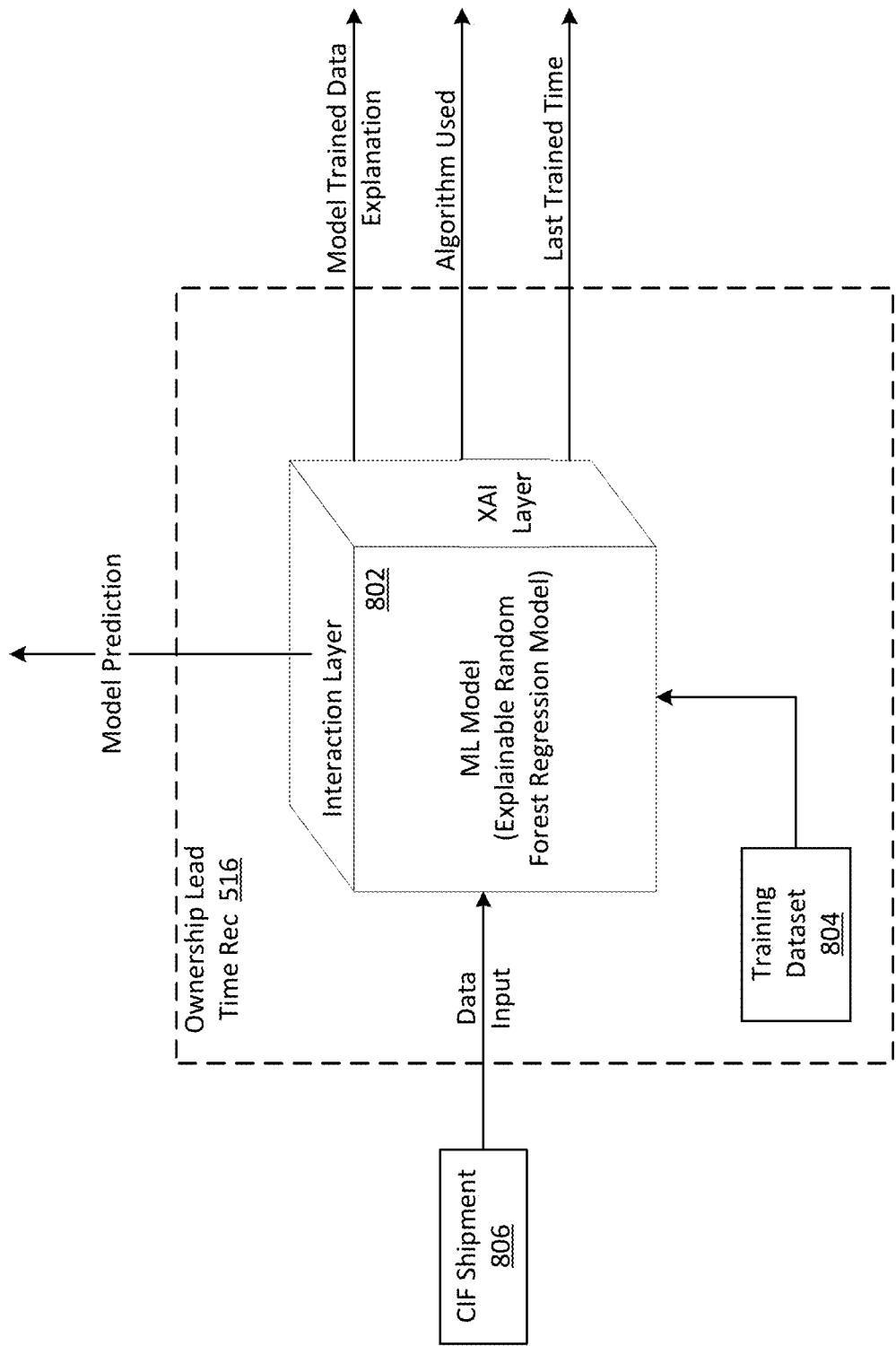
FIG. 8 is a diagram of an example topology that can be used to predict a lead time for ownership transfer along with an explanation of the rationale behind the prediction for a cost, insurance, and freight (CIF) shipment, in accordance with an embodiment of the present disclosure.

Referring now to FIG. 8 in which like elements of FIG. 5 are shown using like reference designators, shown is a diagram of an example topology that can be used to predict a lead time for ownership transfer along with an explanation of the rationale behind the prediction for a cost, insurance, and freight (CIF) shipment, in accordance with an embodiment of the present disclosure. As shown in FIG. 8, ownership lead time recommendation module 516 includes an explainable random forest regression model 802. In some embodiments, explainable random forest regression model 802 may correspond to the explainable random forest regression model implemented within ownership lead time recommendation module 516 of FIG. 5. Explainable random forest regression model 802 can be trained and tested using machine learning techniques with a training dataset 804. In some embodiments, training dataset 804 may correspond to the training dataset generated by training dataset generation module 512 of FIG. 5. In such embodiments, training dataset 804 can be retrieved from data store 514 of FIG. 5. As described previously, training dataset 804 for explainable random forest regression model 802 may be generated from a corpus of historical CIF shipment data. Once explainable random forest regression model 802 is sufficiently trained, ownership lead time recommendation module 516 can, in response to receiving information regarding a CIF shipment (e.g., an actual CIF shipment), predict a lead time for ownership transfer along with an explanation of the rationale behind the prediction.

For example, as shown in FIG. 8, a feature vector 806 that represents a CIF shipment, such as some or all the variables that may influence the prediction of a lead time for ownership transfer, may be determined and input, passed, or otherwise provided to the trained explainable random forest regression model 802. In some embodiments, the input feature vector 806 (e.g., the feature vector representing the CIF shipment) may include some or all the relevant features which were used in training explainable random forest regression model 802. In response to the input, the trained explainable random forest regression model 802 can output a regression response which is a prediction of the number of days from the start of the shipment the ownership transfer should occur. An XAI of explainable random forest regression model 802 can generate an explanation of the interaction between the dependent variable (target variable) and independent variables with respect to the predicted number of days from the start of the shipment the ownership transfer should occur. For example, as shown in FIG. 8, the XAI may generate explanations such as how the features contributed to the prediction ("Model Trained Data Explanation"), the algorithm used to make the prediction ("Algorithm Used"), and the last time the model was trained ("Last Time Trained"). In general, the XAI conveys an understanding of how the model (i.e., explainable random forest regression model 802) will behave in the future.

In some embodiments, explainable random forest regression model 802 can be retrained and/or retested with an updated training dataset. For example, the training dataset or portions of the training dataset can be updated to include training data based on new or recent CIF shipments or training data that have otherwise not been previously used to train and/or test explainable random forest regression model 802. Retraining in this manner updates explainable random forest regression model 802 with new and/or updated training data and enables explainable random forest regression model 802 to generate the most accurate predictions with the new and/or updated training data.

Figure 9:
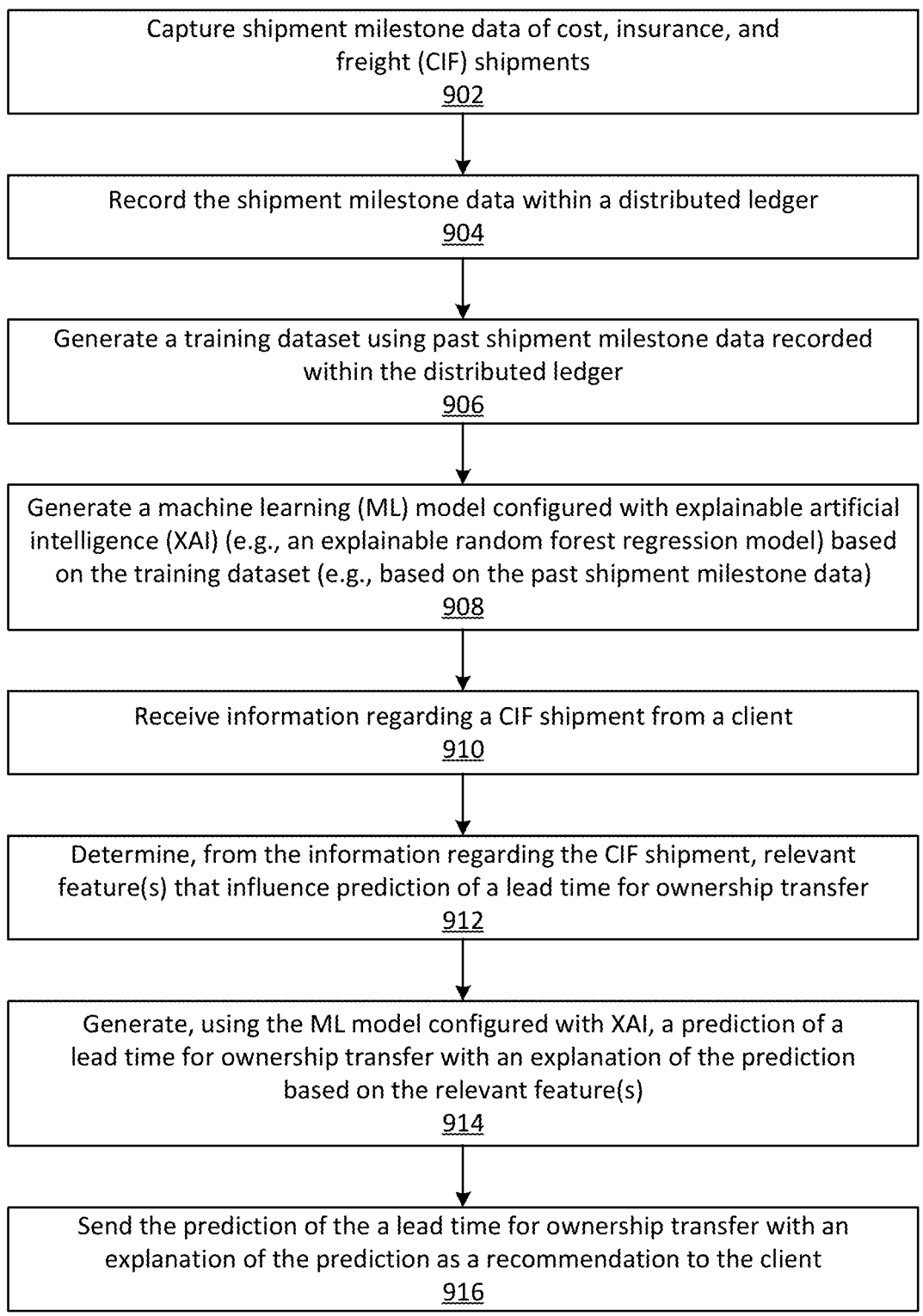
FIG. 9 is a flow diagram of an example process for prediction of a lead time for ownership transfer for a cost, insurance, and freight (CIF) shipment, in accordance with an embodiment of the present disclosure.

FIG. 9 is a flow diagram of an example process 900 for prediction and recommendation of a lead time for ownership transfer for a cost, insurance, and freight (CIF) shipment, in accordance with an embodiment of the present disclosure. Illustrative process 900 may be implemented, for example, within system 500 of FIG. 5. In more detail, process 900 may be performed, for example, in whole or in part by material movement tracking module 508, permissioned distributed ledger 510, training dataset generation module 512, ownership lead time recommendation module 516, and system interface 518, or any combination of these including other components of system 500 described with respect to FIG. 5.

With reference to process 900 of FIG. 9, at 902, shipment milestone data of cost, insurance, and freight (CIF) shipments may be captured. For example, the shipment milestone data may be based on data regarding the physical movements of materials during transport. In some embodiments, the shipment milestone data may be captured using smart contracts generated for the CIF shipments.

At 904, the shipment milestone data may be recorded within a distributed ledger. In some embodiments, the distributed ledger includes a permissioned distributed ledger configured to execute the smart contracts to capture the shipment milestone data.

At 906, a training dataset may be generated using past shipment milestone data recorded within a distributed ledger. The training dataset includes relevant from the past shipment milestone data that are more relevant to prediction of a lead time for ownership transfer for a CIF shipment.

At 908, an ML model configured with explainable artificial intelligence (XAI) may be generated based on the training dataset. In some embodiments, a random forest regression algorithm with XAI may be trained using the training dataset to generate an explainable random forest regression model. The training can configure the explainable random forest regression model to learn the trends in the training dataset.

At 910, information regarding a CIF shipment may be received from a client. For example, the information may be about a completed CIF shipment between a seller and a buyer. At 912, relevant feature(s) that influence prediction of a lead time for ownership transfer for a CIF shipment may be determined from the received information regarding the CIF shipment.

At 914, a prediction of a lead time for ownership transfer with an explanation of the prediction may be generated using the ML model configured with XAI based on the relevant features. The explanation may convey an understanding of how the model (e.g., the explainable random forest regression model) will behave in the future. For example, a feature vector that represents the relevant feature(s) of the CIF shipment may be generated and input to the explainable random forest regression model. In response, the explainable random forest regression model can output a prediction of a lead time for ownership transfer for the input CIF shipment along with an explanation of the prediction.

At 916, the prediction of the lead time for ownership transfer with the explanation of the prediction may be sent as a recommendation to the client. For example, the recommended lead time for ownership transfer and the explanation may be presented within a dashboard accessible to the seller and buyer associated with the CIF shipment.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
   generating one or more smart contracts, by a computing device, for capturing shipment milestone data of cost, insurance, and freight (CIF) shipments;
   executing the one or more smart contracts, by the computing device, to immutably capture the shipment milestone data within a distributed ledger;
   generating, by the computing device, a training dataset using past shipment milestone data recorded within the distributed ledger, the training dataset comprising a plurality of training samples, each training sample generated from a corpus of historical web journey data of customer web sessions on the website, each training sample of the plurality of training samples to adjust weights in a machine learning (ML) model, wherein training the ML model includes inputting different portions of the training dataset and comparing predictions of customer actions with target values of the training samples to adjust weights in the ML model;
   generating, by the computing device, the ML model to predict a lead time for ownership transfer using the training dataset, the ML model configured with explainable artificial intelligence (XAI);
   receiving, by the computing device, information regarding a CIF shipment from another computing device;
   determining, by the computing device, one or more relevant features from the information regarding the CIF shipment, the one or more relevant features influencing prediction of a lead time for ownership transfer;
   generating a feature vector representing the one or more relevant features;
   inputting the feature vector to the ML model configured with XAI to generate;
      a prediction of a lead time for ownership transfer, and
      an explanation of the prediction for the CIF shipment based on the determined one or more relevant features, the explanation indicating a future behavior of the ML model and including how the relevant features contributed to the prediction, an algorithm used to make the prediction, and a last time the ML model configured with XAI was trained;
   sending, by the computing device, the prediction of the lead time for ownership transfer with the explanation of the prediction to the another computing device; and continuously retraining the ML model configured with XAI based on the prediction of the lead time and the explanation of the prediction.

2. The method of claim 1, wherein the ML model configured with XAI includes an explainable random forest regression model.

3. The method of claim 1, wherein the shipment milestone data is based on data regarding physical movements of materials during transport.

4. The method of claim 1, wherein the distributed ledger includes a permissioned distributed ledger configured to execute the smart contracts to capture the shipment milestone data.

5. The method of claim 1 further comprising providing a dashboard for presenting the prediction of a lead time for ownership transfer and an explanation of the prediction for the CIF shipment.

6. The method of claim 1 further comprising receiving material movement data in real-time from one or more gateways and immutably capturing the material movement data in the distributed ledger.

7. The method of claim 1, wherein the training dataset comprises a plurality of training/testing samples, wherein each training/testing sample of the plurality of training/testing samples includes one or more features extracted from the past shipment milestone data.

8. The method of claim 7, wherein the one or more features includes a feature indicative of an organization shipping, a route, a carrier, a vessel name, a pallets per shipment, a year, a quarter, a month, or a week of year.

9. A system comprising:
one or more non-transitory machine-readable mediums configured to store instructions; and
one or more processors configured to execute the instructions stored on the one or more non-transitory machine-readable mediums, wherein execution of the instructions causes the one or more processors to carry out a process comprising:
generating one or more smart contracts for capturing shipment milestone data of cost, insurance, and freight (CIF) shipments;
executing the one or more smart contracts to immutably capture the shipment milestone data within a distributed ledger;
generating a training dataset using past shipment milestone data recorded within the distributed ledger, the training dataset comprising a plurality of training samples, each training sample generated from a corpus of historical web journey data of customer web sessions on the website, each training sample of the plurality of training samples to adjust weights in a machine learning (ML) model, wherein training the ML model includes inputting different portions of the training dataset and comparing predictions of customer actions with target values of the training samples to adjust weights in the ML model;
generating the ML model to predict a lead time for ownership transfer using the training dataset, the ML model configured with explainable artificial intelligence (XAI);
receiving information regarding a CIF shipment from a computing device;
determining one or more relevant features from the information regarding the CIF shipment, the one or more relevant features influencing prediction of a lead time for ownership transfer;
generating a feature vector representing the one or more relevant features;
inputting the feature vector to the ML model configured with XAI to generate:
a prediction of a lead time for ownership transfer; and
an explanation of the prediction for the CIF shipment based on the determined one or more relevant features, the explanation indicating a future behavior of the ML model and including how the relevant features contributed to the prediction, an algorithm used to make the prediction, and a last time the ML model configured with XAI was trained;
sending, by the computing device, the prediction of the lead time for ownership transfer with the explanation of the prediction to the another computing device, and
continuously retraining the ML model configured with XAI based on the prediction of the lead time and the explanation of the prediction.

10. The system of claim 9, wherein the ML model configured with XAI includes an explainable random forest regression model.

11. The system of claim 9, wherein the shipment milestone data is based on data regarding physical movements of materials during transport.

12. The system of claim 9, wherein the distributed ledger includes a permissioned distributed ledger configured to execute the smart contracts to capture the shipment milestone data.

13. The system of claim 9, wherein the training dataset comprises a plurality of training/testing samples, wherein each training/testing sample of the plurality of training/testing samples includes one or more features extracted from the past shipment milestone data.

14. The system of claim 13, wherein the one or more features includes a feature indicative of an organization shipping, a route, a carrier, a vessel name, a pallets per shipment, a year, a quarter, a month, or a week of year.

15. A non-transitory machine-readable medium encoding instructions that when executed by one or more processors cause a process to be carried out, the process including:
generating one or more smart contracts for capturing shipment milestone data of cost, insurance, and freight (CIF) shipments;
executing the one or more smart contracts to immutably capture the shipment milestone data within a distributed ledger;
generating a training dataset using past shipment milestone data recorded within the distributed ledger, the training dataset comprising a plurality of training samples, each training sample generated from a corpus of historical web journey data of customer web sessions on the website, each training sample of the plurality of training samples to adjust weights in a machine learning (ML) model, wherein training the ML model includes inputting different portions of the training dataset and comparing predictions of customer actions with target values of the training samples to adjust weights in the ML model;
generating the ML model to predict a lead time for ownership transfer using the training dataset, the ML model configured with explainable artificial intelligence (XAI);
receiving information regarding a CIF shipment from another computing device determining one or more relevant features from the information regarding the CIF shipment, the one or more relevant features influencing prediction of a lead time for ownership transfer;

generating a feature vector representing the one or more relevant features;
inputting the feature vector to the ML model configured with XAI to generate:
a prediction of a lead time for ownership transfer, and
an explanation of the prediction for the CIF shipment based on the determined one or more relevant features, the explanation indicating a future behavior of the ML model and including how the relevant features contributed to the prediction, an algorithm used to make the prediction, and a last time the ML model configured with XAI was trained;
sending, by the computing device, the prediction of the lead time for ownership transfer with the explanation of the prediction to the another computing device; and
continuously retraining the ML model configured with XAI based on the prediction of the lead time and the explanation of the prediction.

16. The machine-readable medium of claim 15, wherein the ML model configured with XAI includes an explainable random forest regression model.

17. The machine-readable medium of claim 15, wherein the shipment milestone data is based on data regarding physical movements of materials during transport.

* * * * *